United States Patent [19]

Yoshida et al.

[11] 4,420,828
[45] Dec. 13, 1983

[54] OPTICAL RECORDING AND/OR REPRODUCING DEVICE

[75] Inventors: Tomio Yoshida, Katano; Michiyoshi Nagashima, Ikoma; Shunji Harigae, Neyagawa; Makoto Ichinose, Moriguchi; Noboru Wakami, Osaka, all of Japan

[73] Assignee: Matsushita Electric Industrial Co., Ltd., Osaka, Japan

[21] Appl. No.: 216,272

[22] Filed: Dec. 15, 1980

[30] Foreign Application Priority Data

Dec. 14, 1979 [JP] Japan .................................. 54-163418

[51] Int. Cl.³ .......................... G11B 21/02; G11B 7/12
[52] U.S. Cl. ....................................... 369/47; 358/342; 369/32; 369/33; 369/41
[58] Field of Search .................. 358/128.5, 128.6, 127, 358/129-132, 342, 335; 369/32-33, 41, 47, 50, 43-46; 365/234, 215; 360/77, 72.2, 74.4, 10, 33, 35, 33.1, 35.1, 10.1

[56] References Cited

U.S. PATENT DOCUMENTS

| | | | |
|---|---|---|---|
| 3,931,457 | 1/1976 | Mes ................................. | 358/128.6 |
| 4,310,914 | 1/1982 | Riddle ................................. | 369/43 |
| 4,313,134 | 1/1982 | Rustman et al. ................. | 358/128.5 |

OTHER PUBLICATIONS

Bennion et al., Interactive Video Disc Systems for Education, J of the SMPTE, vol. 84, No. 12, 12/75, 949-953.

*Primary Examiner*—Raymond F. Cardillo, Jr.
*Attorney, Agent, or Firm*—Burgess, Ryan & Wayne

[57] ABSTRACT

An optical reproducing device for reproducing still image signals recorded on circular tracks and moving image or audio signals recorded on spiral tracks on a disk. Concentric and spiral tracks may be intermingled on the same disk. The address signals for each concentric track or each coil of a spiral track are previously recorded. When the address signals are reproduced, they are processed so as to detect whether the readout address signals changes with time, thereby detecting whether the accessed track is concentric or spiral. An optical head drive system is controlled in a manner depending on whether the track is circular or spiral, so that an optical head can scan the desired concentric or spiral track.

1 Claim, 7 Drawing Figures

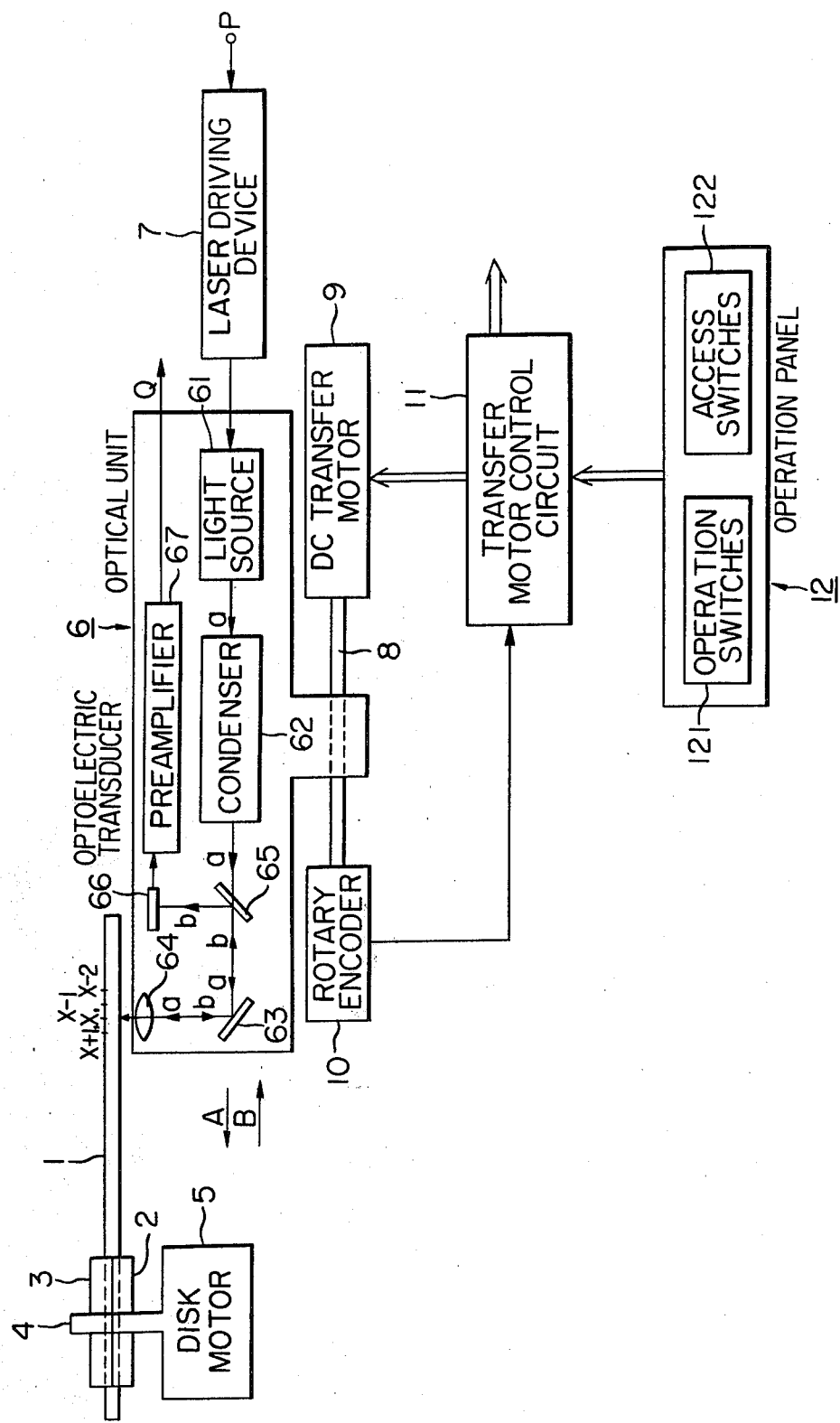

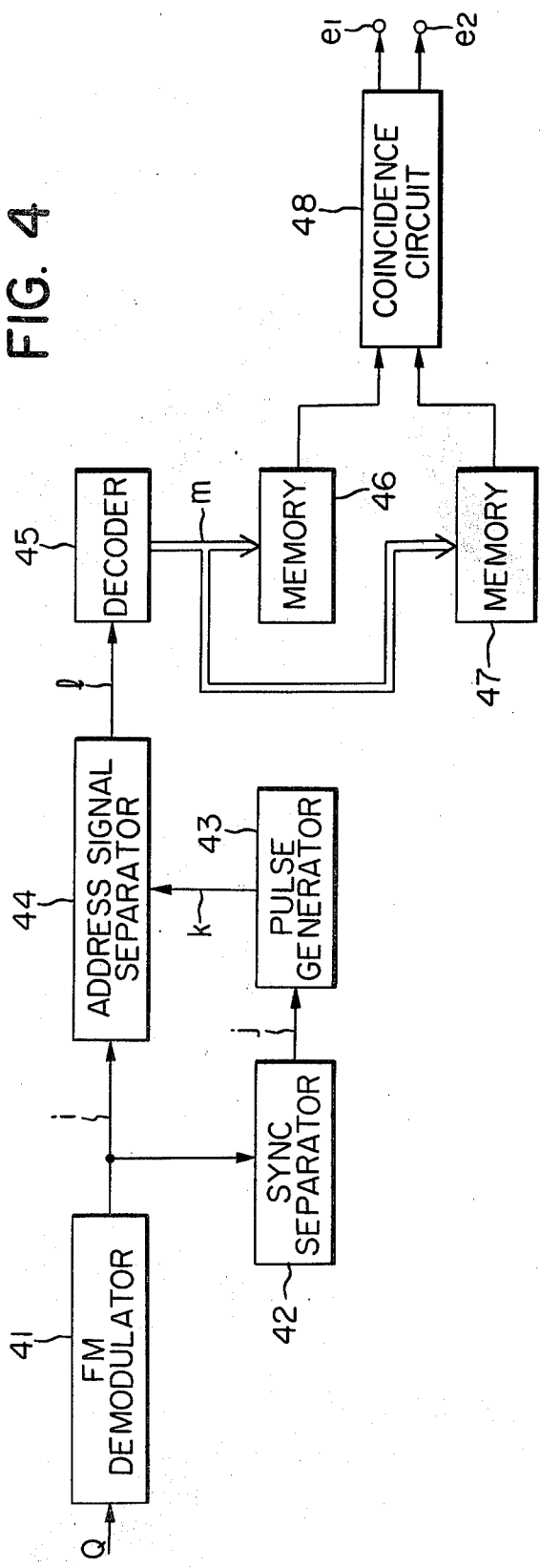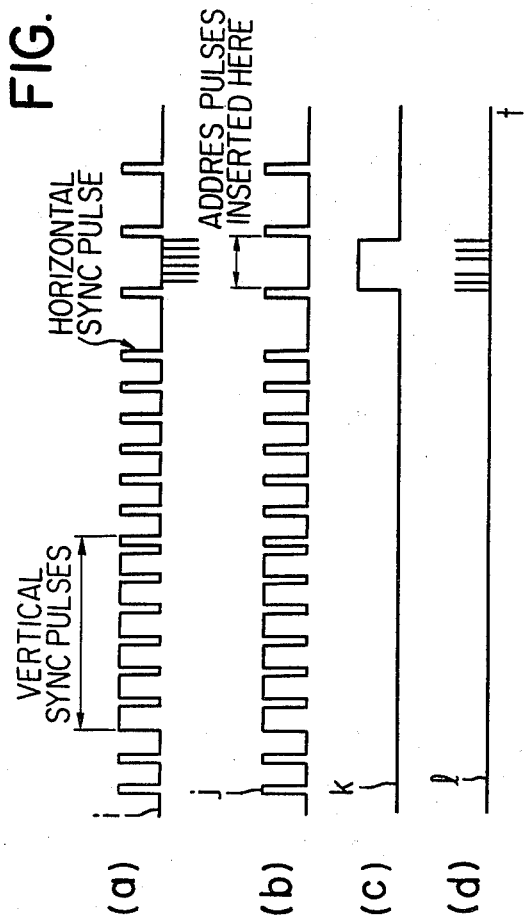

OPTICAL RECORDING AND/OR REPRODUCING DEVICE

BACKGROUND OF THE INVENTION

The present invention relates to an optical recording and reproducing device utilizing disks having circular and/or spiral record tracks.

There has been invented and demonstrated an optical recording and reproducing system in which a laser light beam less than 1 μm in diameter is focused on a spinning disk coated with a photosensitive compound, so that data can be recorded in the form of a variable-density track or an irregular surface track at a high data-packing density; for reproduction a reading laser light beam is used. The optical video disks have been well known as a means only for reproducing the data pre-recorded at a higher degree of data-packing density. This technique has been used to record video signals, audio signals and digital signals.

SUMMARY OF THE INVENTION

The primary object of the present invention is to provide an optical recording and reproduction device which can record signals on circular and/or spiral tracks on a disk depending upon the contents of the signals to be recorded and which can reproduce the recorded signals without causing any confusion, even where circular or spiral tracks are intermingled on the same disk.

For instance, when the signal to be recorded is continuous and represents a continuously moving picture or is an audio signal, it is recorded in a spiral track; but when the signal to be recorded is discontinuous and represents a still picture such as a single frame, it is recorded in a concentric circular track.

Thus, an optical recording disk may have spiral tracks and concentric circular tracks intermingled according to a predetermined pattern or at random, and the desired signals are recorded in these spiral or concentric circular tracks.

Therefore, a further object of the present invention is to provide a device for reproducing the desired signal from the optical recording disk, on which the tracks of different configurations are intermingled, by detecting a track of a specific configuration and controlling the device accordingly.

The present invention provides an optical recording and/or reproducing device having (i) concentric tracks along which still image signals may be recorded, and (ii) spiral tracks along which moving image signals may be recorded. The moving image signals are disposed in random order on a disk and one desired track accessed by an optical head is automatically inspected to determine if it is concentric or spiral; and the signal recorded on the accessed and identified concentric or spiral track is then automatically reproduced.

As described above, according to the present invention, concentric and spiral tracks disposed in random order on a disk can be automatically inspected to determine whether an accessed track is concentric or spiral, and then the accessed concentric or spiral track is scanned. As a result, disks upon which still image signals and moving image signals (or still image signals and audio signals) are recorded in random order can be easily reproduced.

BRIEF DESCRIPTION OF THE DRAWINGS

FIG. 2 shows the construction of an optical recording and reproducing device according to a preferred embodiment of the present invention;

FIG. 4 is a block diagram of a circuit according to a preferred embodiment of the present invention, for detecting whether the track accessed by an optical head is concentric or spiral;

FIG. 5 shows waveforms of signals generated in the operation of the circuit shown in FIG. 4;

DETAILED DESCRIPTION OF THE INVENTION

As described previously, still images and moving images or audio signals may be recorded on concentric and spiral tracks, respectively, on the surface of an optical disk. The present invention will be described below mainly in conjunction with the recording of still and moving images.

Figure 1:
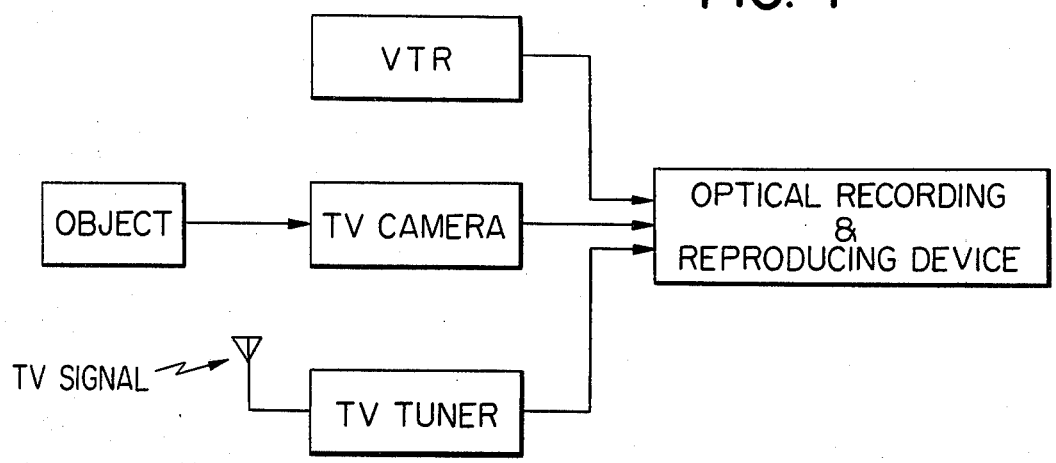
FIG. 1 is a block diagram showing use of an optical recording and/or reproducing device, according to the prior art.

FIG. 1 shows the input systems to an optical recording and reproducing device. When it is desired to record both still and moving images on the surface of a disk, a system may be utilized in which both the still and moving images are recorded on the spiral tracks. In the optical recording and reproducing device, the disk and an optical head move with respect to each other at a predetermined velocity, so that a light beam emitted from the optical head may trace a spiral track on the surface of the disk. As a result, the video signal to be recorded must be supplied in synchronism with the relative movement between the optical head and the disk.

However, in the case of recording single sequential fields of desired images which are obtained through a television camera or a television tuner shown in FIG. 1, spiral track recording is undesirable, because even when no recording is needed, the relative movement between the optical head and the disk continues, so that a considerable recording area of the disk is wasted. Therefore such single sequential fields, representing still images, are usually recorded on circular, i.e. concentric tracks.

When reproducing signals from a disk upon which still and moving images are recorded in respective circular and spiral tracks at random, the still image, moving image and no-signal tracks must be discriminated from each other.

In view of the above, in order to facilitate access to and reproduction of a desired track on the disk, it is preferable that the still image is recorded onto a spiral track. With this system, the light beam from the optical head can be kept tracking a concentric track endlessly until the desired still image input is received. Thus, the output signal from a television camera or television tuner can be recorded on the disk within any desired time interval, without lowering the recording density.

According to one embodiment of the present invention, concentric and spiral tracks bearing still and moving images are recorded at random on the surface of the disk, and each track is given an address. In the reproduction mode, whether the addressed track is concentric or spiral is detected, and the relative movement between the optical head and the disk is controlled depending upon the detected signal; and consequently the still image recorded on a concentric track or the moving image recorded on a spiral track can be correctly reproduced.

The present invention may be equally applied to an automatic reproducing device capable of reproducing signals recorded only on the concentric tracks or only on the spiral tracks of the disk.

According to another embodiment of the present invention, the disk is provided with guide tracks over its surface which can be optically accessed. Some guide tracks are concentric, others are spiral. Each guide track is assigned a specific address signal. Therefore, a still image is recorded along a concentric track while a moving image along a spiral track; and the desired concentric or spiral track is accessed and reproduced.

The present invention may also be applied to an optical recording and/or reproducing device of the type capable of automatically detecting whether the addressed track is concentric or spiral.

FIG. 2 shows the construction of an optical recording and reproducing device according to a preferred embodiment of the invention. The process for forming the information track in response to the above-described recording signal is as follows: a disk 1 coated with a photosensitive medium rotates about a spindle 4 of a disk motor 5. The rotational speed is for instance 1800 r.p.m. so that one frame of an NTSC video signal may be recorded in one rotation.

Numeral 2 shows a turntable and numeral 3 shows a pressure plate. Numeral 6 shows an optical unit (optical head). Numeral 61 shows a light source such as a laser which emits the light ray or beam (a). Numeral 62 shows a condenser system for collecting the light. Numeral 63 shows a conventional tracking mirror. Numeral 64 shows an objective for concentrating the light into a very fine beam which in turn impinges on the disk 1. The focus of the objective 64 is controlled with a conventional voice coil or the like.

A beam splitter 65 separates the light (b) reflected back from the disk 1 from the path of the incident light (a), and redirects the light (b) to a photoelectric or high-speed optoelectric transducer 66. The transducer 66 may comprise a PIN diode which detects the signal recorded on the disk 1, the focusing error signal and the tracking error signal. Numeral 67 shows a preamplifier of the optoelectric transducer 66, the reproduced signal being derived from a terminal Q thereof. Numeral 7 shows a laser driving device, the signal to be recorded (for instance, frequency-modulated video signal) being applied to a terminal P thereof. Numeral 8 shows a lead-screw for displacing the optical unit 6 with respect to the disk 1 in the direction A or B. Numeral 9 shows a DC transfer motor for imparting rotating force to the lead-screw 8.

Numeral 10 shows a rotation angle sensor consisting of a rotary encoder or the like. The rotary encoder 10 is used when the optical unit 6 must be displaced stepwise, so that the concentric tracks $(x-2)$, $(x-1)$, $(x)$, $(x+1)$, etc. are formed by using the transfer motor 9. More specifically, the angle of rotation of the lead-screw 8 is detected and when it rotates through a predetermined angle, the rotary encoder 10 generates a signal in response to which the transfer motor 9 is stopped. Numeral 11 shows a transfer motor control circuit. Numeral 12 shows an operation panel with operation switches 121 (such as selection switches for selecting the recording or reproduction mode, the still or moving image recording mode, the direction A or B of the movement of the optical unit 6, and so on) and access switches 122 (such as numeral keys for entering the address to be accessed, a selection switch for selecting the access mode, and so on).

Assume that the moving image recording mode is selected. Then the transfer motor 9 is rotated without being controlled by the rotary encoder 10, so that the lead-screw is transferred or rotated continuously at a predetermined velocity. Thus the signal is recorded along a helical track on the disk 1. When the moving image recording mode is changed to the still image recording mode, the transfer motor 9 is rotated under the control of the rotary encoder 10, so that the lead screw 8 is rotated stepwise and consequently the signal is recorded along a concentric track on the disk 1.

It is to be understood that the present invention is not limited to the transfer motor 9 and the lead-screw 8 shown in FIG. 2; and that any suitable motor such as a DC motor or a linear motor can be used. The use of a linear motor is advantageous in that the lead-screw 8 can then be eliminated.

Figure 3:
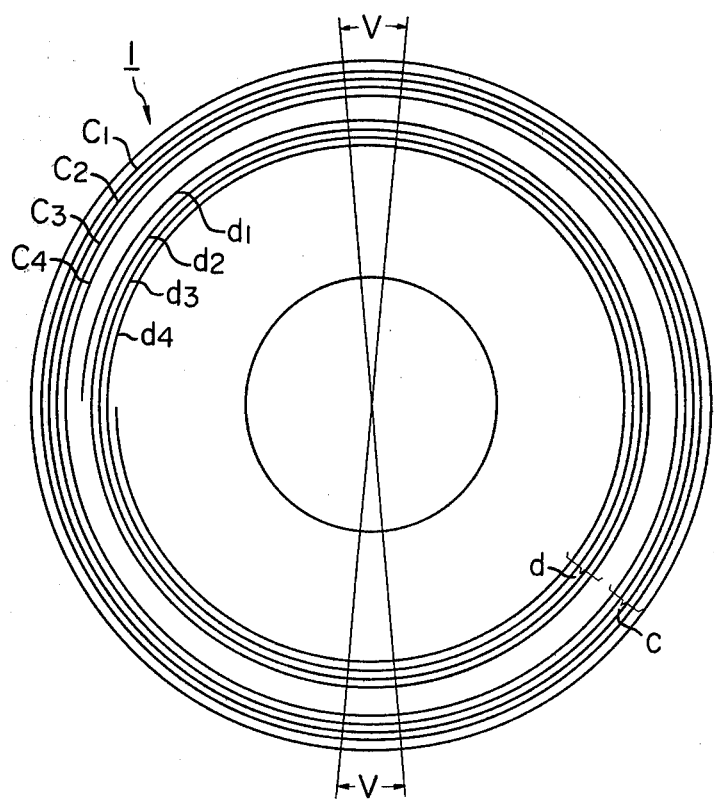
FIG. 3 shows a disk with concentric and spiral tracks, which may be utilized by the arrangement of the present invention.

FIG. 3 shows one example of the disk 1 upon which still and moving images are randomly recorded with the device shown in FIG. 2. In FIG. 3, the region c contains concentric tracks along which still images are recorded on the disk rotating at 1800 r.p.m. $c_1$ through $c_4$ are concentric tracks along each of which a one frame still image is recorded. The region d contains spiral tracks along which moving images are recorded.

$d_1$ through $d_4$ are spiral tracks along which the signals are recorded. The segmental regions V show the regions at which the vertical sync signal of the recorded video signal is recorded. According to the prior art techniques, the address signal for each track is superimposed on the video signal in the vertical sync signal regions. For instance, the numbers 1 through 4 are assigned to the tracks $c_1$ through $c_4$, and the numbers 5 through 8 are assigned to the tracks $d_1$ through $d_4$, respectively. These addresses are used as access signals when the tracks along which the video signals are recorded are accessed at random and are reproduced.

As previously described, the operator pushes the operation switches 121 depending upon whether a still or moving image is to be recorded on the disk 1 shown in FIG. 3. Then the optical head moves along a concentric or spiral track with respect to the disk 1. When the access switches (the number keys) 122 shown in FIG. 2 are depressed to access the desired track number, it must be determined whether the track which the optical head finds is concentric or spiral, so that the transfer motor 9 and the lead-screw 8, (See FIG. 2) can be controlled accordingly. More specifically, when the optical head finds a spiral track, the transfer motor 9 must be rotated so as to continuously displace the optical unit 6, thereby causing said optical head to trace a spiral track on the disk 1.

Next, a device or system for automatically detecting whether the track which the optical unit finds (in the case of accessing and reproducing information on the disk of the type shown in FIG. 3 in which images are recorded at random on both concentric and spiral tracks) is concentric or spiral and for controlling the movement of the optical unit accordingly, will be described. FIG. 4 shows one example of a track detection circuit. FIG. 5 shows the waveforms of the signals at various points in the circuit shown in FIG. 4. FIGS. 5(a), 5(b), 5(c) and 5(d) correspond to the outputs i, j, k and l in FIG. 4.

First, the mode of operation of the track detection circuit shown in FIG. 4 will be described with reference to the waveforms shown in FIG. 5. The output from the preamplifier 67 shown in FIG. 2 is applied to the terminal Q of the FM demodulator 41, which demodulates the output from the preamplifier 67 into the reproduced video signal i. A sync separator 42 separates the vertical and horizontal synchronizing signals from the reproduced video signal i so as to deliver the sync signal j to the address separation pulse generator 43.

In general, the address signal is inserted between the horizontal sync pulses, the interval between them having no picture information. Therefore, the address separation pulse generator 43 generates a pulse k which is time-referenced to the vertical sync pulse so that the time interval carrying the address signal can be sampled.

The address signal separator 44 derives only the address signal l from the reproduced video signal i. A circuit 45 decodes the time-serial address signal l shown in FIG. 5 (d) into the digital signal m. Memories 46 and 47 store the output m from the decoder 45.

After the optical unit 6 has found the desired track in response to an instruction entered on the operation panel 12, the first memory 46 stores the address signal delivered every time the disk motor makes an odd-numbered rotation; that is, the first, third, fifth rotation and so on. On the other hand, the second memory 47 stores the address signal delivered every time when the disk motor 5 completes an even-numbered rotation; that is, the second, fourth rotation and so on. This arrangement wherein memories 46 and 47 alternately store the address signals, can be provided by utilizing the pulse which is generated each time the disk motor 5 makes one rotation.

A coincidence circuit 48 detects whether the content of the memory 46 coincides with that of the memory 47. An output is provided at a terminal $e_1$ when the memory contents are in coincidence, and an output is provided at a terminal $e_2$ when said contents are not coincident.

Assume that the optical unit 6 has found the concentric track c2 on the disk 1 shown in FIG. 3. Then the same address is delivered during successive revolutions of the disk 1. As a result, the coincidence signal is repetitively provided at the terminal e1 of the coincidence circuit 48. When the optical unit 6 has found the spiral track d1 on the disk 1 shown in FIG. 3, the tracks d1, d2 and d3 are sequentially reproduced as the disk rotates, by conventional tracking techniques utilizing the tracking mirror. It follows, therefore, that the address signals stored in the first and second memories 46 and 47 are different from each other during successive revolutions of the disk 1, so that a noncoincidence output signal is derived from the terminal e2 of the coincidence circuit 48.

The rotation of the transfer motor 9 shown in FIG. 2 is controlled depending upon the output signal derived from the output terminal e1 or e2 of the coincidence circuit 48, i.e. on whether the track which the optical unit 6 has found on the disk 1 is concentric or spiral, so that the recorded signal is reproduced without any confusion.

Figure 6:
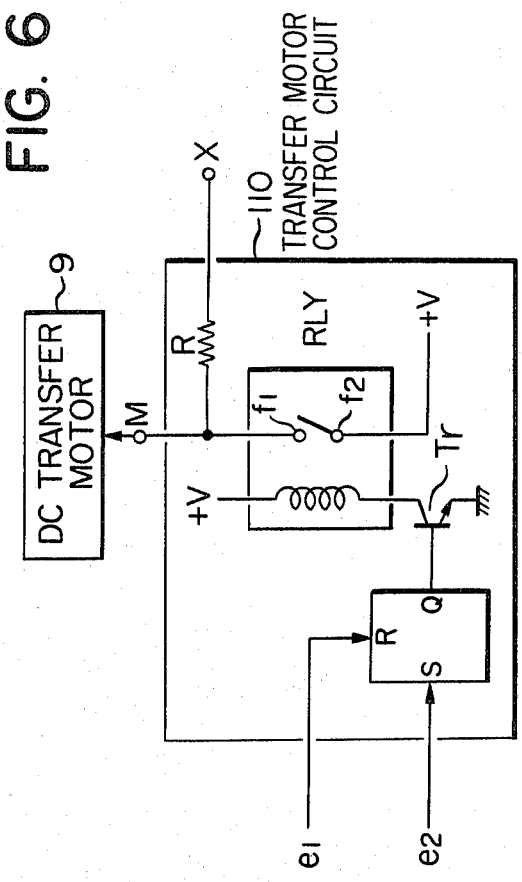
FIG. 6 is a diagram of a circuit for controlling a transfer motor in response to the detected signal from the circuit shown in FIG. 4.

FIG. 6 shows a preferred embodiment of the transfer motor control circuit. Reference numerals used in FIGS. 2 and 4 are also used in FIG. 6 for identical elements. Numeral 110 shows a part of the transfer motor control circuit shown in FIG. 2. For the sake of simplicity, it is assumed that when a voltage is applied to the terminal M of the transfer motor 9, the motor rotates. The coincidence output signal from the coincidence circuit 48 shown in FIG. 4 is provided at the terminal e1 shown in FIG. 6 and is transmitted to the reset terminal R of a flip-flop FF. The noncoincidence output signal from the coincidence circuit 48 is provided at another terminal e2 and is transmitted to the set terminal S of the flip-flop FF.

In response to the Q output of the flip-flop FF, a transistor Tr is turned on or off. The transistor Tr controls a relay RLY. A voltage (+V) is impressed on the contact f2 of the relay RLY and in response to the Q output from the flip-flop FF, the contacts f1 and f2 are closed or opened. More specifically, when the coincidence signal is provided at the terminal e1, the Q output from the flip-flop FF drops to a low level, so that the transistor Tr is turned off and consequently, the contacts f1 and f2 of the relay RLY are opened. As a result, the supply of the voltage (+V) to the transfer motor 9 is suspended, so that the transfer motor 9 will not rotate. Thus, a still image recorded on the concentric track on the disk is reproduced.

When the noncoincidence output signal is provided at the terminal e2, the flip-flop FF is set so that the Q output rises to a high level and consequently the transistor Tr is turned on. Then the contacts f1 and f2 of the relay RLY are closed, so that the voltage (+V) is applied to the terminal M of the transfer motor 9 so that the latter rotates continuously. Thus, the spiral tracks are sequentially reproduced.

The signal obtained by integrating and amplifying the voltage from the tracking mirror (representative of the tracking errors) is applied to the terminal X to activate a conventional transfer servomechanism. The transfer servomechanism is such that the optical unit is displaced so that the voltage representative of the tracking error does not contain a DC component, whereby the tracking control accuracy can be improved.

So far the optical unit has been described as being displaced or shifted with respect to the disk, but is it to be understood that alternatively the disk and the disk motor may be displaced or shifted with respect to the optical unit.

So far the present invention has been described in detail with reference to a disk upon which still and moving images are recorded in random order, but the present invention may provide a device capable of faithfully reproducing signals recorded only on concentric tracks or only on spiral tracks of a disk.

So far the tracks have been described as being defined by the signals recorded thereon. However, the present invention can also be utilized in conjunction with an optical recording and reproducing disk having guide tracks which can be optically detected.

Referring back to FIG. 3, the concentric tracks c1 through c4 are assumed to comprise concentric guide tracks while the spiral tracks d1 through d4 are assumed to comprise spiral guide tracks. A specific address signal for each track is recorded in the sector of each track in the regions V. These guide tracks are trackable by the tracking mirror 63 shown in FIG. 2.

It is assumed that one desires to record a still image which may appear at any time. Then the optical head 6 shown in FIG. 2 is positioned over one of the concentric tracks c1 through c4 and the light beam is projected on the selected concentric guide track by conventional tracking techniques. Since for a concentric track the address signal read from the disk is always the same, the coincidence output signal is derived from the terminal e1 shown in FIG. 4, so that no voltage is impressed on the transfer motor 9 shown in FIG. 9. As a result, the optical head and the disk are held stationary with respect to each other. When the signal representative of the desired still image is applied to the recording terminal; that is, the terminal P in FIG. 2, a recording signal of one frame interval (corresponding to a time interval required for the disk to make one complete rotation) is supplied to the light source 61, and the light (modulated with the recording signal) is projected on the selected track, whereby the desired still image or video signal is recorded.

The spiral guide tracks d1 through d4 shown in FIG. 3 are used for recording moving images. When the optical head is positioned over the selected spiral guide track, the address signal changes each time the disk 1 makes one rotation, so that the transfer motor 9 shown in FIG. 2 shifts the optical head along the guide track.

In this case, the signal applied to the terminal P shown in FIG. 2 is sequentially recorded along the spiral guide track.

Figure 7:
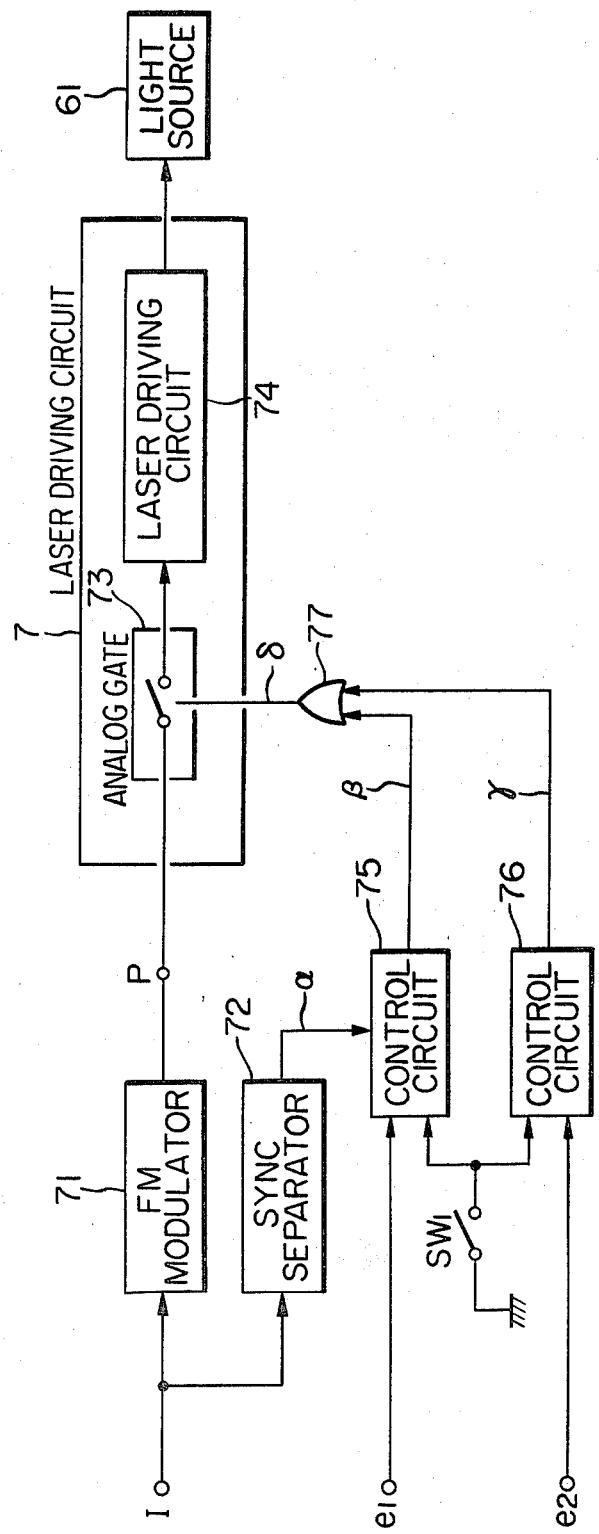
FIG. 7 is a block diagram of a circuit for selectively delivering the recording signal to a light source such as a laser, depending upon whether an accessed guide track is concentric or spiral.

FIG. 7 shows one example of a method for delivering the video signal to the optical recording and reproducing device when the signal is recorded along a concentric guide track or a spiral guide track.

FIG. 1 the composite video signal of the NTSC color television signal is applied to the terminal I. Numeral 71 shows an FM modulator, the FM video signal being obtained from the terminal P (which corresponds to the terminal P in FIG. 2). Numeral 7 shows the laser driving circuit shown in FIG. 2. The on-off operation of an analog gate 73 is controlled in response to the signal on the line so that the recording signal is delivered to the laser driving circuit 74 only during the time interval required for recording the signal. Numeral 61 shows a light source such as a laser shown in FIG. 2.

The vertical sync pulses from sync generator 72 are separated from the composite video signal applied to the terminal I and delivered to the line a. A control circuit 75 causes the analog gate 73 to be closed for only one frame interval (1/30 sec=a time interval required for the disk 1 to make one complete rotation) when the optical head is over the selected concentric guide track, so that the recording signal is then delivered to the light source 61 such as a laser.

The output signal from the terminal e1 in FIG. 4 is coupled to the terminal e1 of FIG. 7 so that the output is derived when the optical head has found the selected concentric track, so that the control circuit 75 is activated or enabled. When the output is applied to the terminal e1 so that a switch SW1 is closed, in response to the signal delivered to the line a, the signal which rises to a high level for only one frame interval (1/30 sec) is delivered on the line b and transmitted through an OR gate 77 to the analog gate 73, so that the gate 73 is closed for only one frame interval and consequently the recording signal is delivered for one frame interval.

A circuit 76 controls the delivery of the recording signal when the optical head has found a spiral track. The terminal e2 in FIG. 7 is connected to the terminal e2 in FIG. 4 so that an output is provided when the optical head has found a spiral track. When the switch Sw1 is closed under these conditions, the high-level signal is delivered to the line γ and transmitted through the OR gate 77. As a result, the signal on the line δ rises to a high level so that the analog gate 73 is closed and subsequently the recording signal is delivered to the light source 61 such as a laser.

The above-described recording mode is maintained until the switch SW1 is opened or the output at the terminal e2 disappears. The signals to be recorded along the concentric and spiral guide tracks are delivered in the manner described above. In the reproduction mode, whether the selected guide track is concentric or spiral is automatically detected in a manner substantially similar to that described above in conjunction with the recording mode, and the reproduction mode is then adapted to the shape or configuration of the selected or accessed track.

What is claimed is:

1. An optical reproducing device utilizing an optical record disk having concentric circular guide tracks and spiral guide tracks intermingled thereon, each of said circular tracks and portions of each spiral track with different radii having optically readable information signals therein and an address sector containing an optically readable address signal, said sectors being aligned along a diameter of said disk and subtending the same radial angle, said device comprising:

an optical transducer head;

a disk carrier for supporting and rotating said optical record disk;

transport means for providing relative radial movement between said optical transducer head and said disk carrier;

address reading means coupled to said optical transducer head for reading out the address signal from each address sector of said disk;

track address change detection means coupled to said address reading means for providing a circular track indication signal when successive address signals read out by said address reading means have identical values, and for providing a spiral track indication signal when said successive address signals have different values from each other;

transport control means coupled to said track address change detection means and to said transport means for (i) causing said transport means to provide continuous relative movement between said optical transducer head and said disk carrier in response to said spiral track indication signal, and (ii) interrupting the operation of said transport means to halt said relative radial movement in response to said circular track indication signal; and reproduce control means responsive to said address signals for reproducing said information signals, whereby said device may reproduce signals recorded on intermingled circular and spiral tracks of an optical record disk.

* * * * *